UNITED STATES PATENT OFFICE.

ALFRED A. WELLS, OF MONTCLAIR, NEW JERSEY.

CATALYZER.

1,179,484.  Specification of Letters Patent.  Patented Apr. 18, 1916.

No Drawing.  Application filed October 17, 1913. Serial No. 795,734.

*To all whom it may concern:*

Be it known that I, ALFRED A. WELLS, a citizen of the United States, and resident of Montclair, in the county of Essex and State of New Jersey, have invented certain new and useful Improvements in Catalyzers, of which the following is a specification.

This invention relates to catalytic bodies and relates in particular to catalyzers comprising a metal or metal oxid active body supported on a carrier of non-active material.

It has been proposed to use pumice stone, kieselguhr and other various bodies for the supports in the preparation of catalyzers, but such various supports have several disadvantages among which may particularly be noted waste of metal material involved because the porous body absorbs into its inner canals great quantities of the metal salt solution employed and such metal is practically without action because the penetration of liquids or gases into the interior is relatively very slight in comparison with the external action at the surface of the fragments. Accordingly it is necessary to use with porous supports often from 30-50% of metal salt solution, but salts of platinum or palladium are so expensive that waste of this kind makes the catalyzer very costly.

The presence of the metal compound in the interior of the porous mass renders its extraction difficult when seeking to regenerate or recover the spent material. During its use, especially in the addition of hydrogen to oils and fats, a certain amount of carbonization takes place and the pores become to some extent, at least, clogged or the internal canals become surfaced with a carbonaceous deposit which prevents re-solution of the metal when its recovery is attempted and hence for these and other reasons I regard porous material capable of absorbing catalyzer and solutions and oils to be objectionable for many purposes, in particular that already mentioned, the hydrogenation of oils, especially the hydrogenation of petroleum oils to convert unsaturated compounds and stabilize the bodies which are normally easily oxidizable and tend to resinify.

I have found that eminently satisfactory results may be obtained with the use of only $\frac{1}{4}$ to 1% of catalyzer based on the support employed if the latter is non-porous so that the metal is fairly uniformly plated, or sheeted over the surface thereof and as a suitable support for carrying out the present invention I preferably employ glass which may be of varying degrees of fineness, being quite finely-divided when I treat oils in a liquid state, but when treating vapors such as the vapors of gasolene aforementioned, I prefer glass fragments of about $\frac{1}{2}$ inch diameter which preferably should be made from glass raw material substantially free from sulfur. In any case it is desirable to wash the fragments with hot dilute nitric acid, and then immerse in a very concentrated solution of nickel nitrate, which may be prepared by adding just enough water to the crystals of this salt to render it liquid on gentle heating. The fragments which are coated in this way with the salt are then ignited at a temperature about 370° F., which temperature I find particularly useful for effecting a uniform plating or sheeting of the nickel material. The product then may be reduced in a current of hydrogen and vapors of unsaturated gasolene mingled with hydrogen or a hydrogen-containing gas passed through the interstices of the catalytic mass, a reaction which takes place readily at about 250° C. Although hydrogen-containing gases may be used it is desirable to use pure hydrogen.

My invention is not limited to the use of one per cent. or less of active material on a non-porous support, but I may use a larger percentage, if desired, it being particularly useful or necessary to secure a very fine sheet or coating of the active material without causing formation of thick encrusting masses and the glass fragments may be centrifuged after immersing in the nickel solution as above described in order to avoid an excess of coating which would prevent the formation of a thin active layer. Besides glass, other equivalent bodies of a non-porous character may likewise be employed.

What I claim is:

1. A catalyzer comprising fragments of glass about one-half inch in diameter, sheeted with reduced nickel, and the proportion of the metal to glass being about 1:100.

2. A catalyzer comprising reduced nickel coated on glass, the proportion of nickel being about 1/100 of the weight of the glass.

3. A catalyzer comprising fragments of glass sheeted with reduced nickel, the proportion of nickel to glass being about 1:100.

4. A catalyzer comprising fragments of glass sheeted with a relatively small proportion of reduced nickel having catalytic properties.

5. A catalyzer comprising fragments of glass coated with reduced nickel having catalytic properties.

6. A catalyzer comprising catalytic metal coated on fragments of glass, whose surface is free from acid soluble material.

7. A catalyzer comprising catalytic metal coated on sulfur free glass fragments.

Signed at Montclair in the county of Essex and State of New Jersey this 16th day of October, A. D. 1913.

ALFRED A. WELLS.

Witnesses:
I. DAVID LUBETZKI,
JOEL STARRELS.